(12) United States Patent
Schmidt et al.

(10) Patent No.: US 11,621,575 B2
(45) Date of Patent: Apr. 4, 2023

(54) METHOD FOR OPERATING AN ELECTRICAL ENERGY STORE SYSTEM

(71) Applicant: Robert Bosch GmbH, Stuttgart (DE)

(72) Inventors: Alexander Schmidt, Donaueschingen (DE); Christoph Woll, Gerlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 207 days.

(21) Appl. No.: 16/907,551

(22) Filed: Jun. 22, 2020

(65) Prior Publication Data
US 2020/0403435 A1 Dec. 24, 2020

(30) Foreign Application Priority Data
Jun. 21, 2019 (DE) ........................ 102019209037.0

(51) Int. Cl.
*H02J 7/00* (2006.01)
*B60L 50/60* (2019.01)
*B60L 58/22* (2019.01)
*B60L 58/24* (2019.01)

(52) U.S. Cl.
CPC ........ *H02J 7/007182* (2020.01); *B60L 50/60* (2019.02); *B60L 58/22* (2019.02); *B60L 58/24* (2019.02); *H02J 7/0013* (2013.01); *B60L 2240/545* (2013.01); *B60L 2240/547* (2013.01)

(58) Field of Classification Search
CPC ... H02J 7/007182; H02J 7/0013; B60L 50/60; B60L 58/22; B60L 58/24; B60L 2240/545; B60L 2240/547; B60L 58/18; B60L 2240/549; B60L 3/0046; B60L 58/13; Y02E 60/10; Y02T 10/70; G01R 31/388; G01R 31/3648; G01R 31/389; H01M 10/441
See application file for complete search history.

(56) References Cited

U.S. PATENT DOCUMENTS

| | | | | |
|---|---|---|---|---|
| 2005/0017684 A1* | 1/2005 | Brecht | ................. | H01M 10/44 320/131 |
| 2008/0164849 A1* | 7/2008 | Ciaramitaro | .......... | H02J 7/0091 320/161 |
| 2009/0243548 A1* | 10/2009 | Hoff | .................... | H02J 7/00712 320/161 |

(Continued)

FOREIGN PATENT DOCUMENTS

| DE | 102011077448 A1 | 12/2012 |
|---|---|---|
| DE | 102012018127 A1 | 3/2014 |

(Continued)

*Primary Examiner* — Nha T Nguyen
(74) *Attorney, Agent, or Firm* — Norton Rose Fulbright US LLP; Gerard Messina

(57) ABSTRACT

A method for operating an electrical energy store system including at least two electrical energy store units. The method includes: a) ascertaining voltages of the at least two electrical energy store units; b) ascertaining at least one first characteristic value of the ascertained voltages; c) ascertaining a charge voltage limiting value and/or a discharge voltage limiting value as a function of the ascertained at least one characteristic value; and d) operating the electrical energy store system as a function of the ascertained charge voltage limiting value and/or discharge voltage limiting value.

8 Claims, 4 Drawing Sheets

(56) References Cited

U.S. PATENT DOCUMENTS

| | | | |
|---|---|---|---|
| 2009/0266631 A1* | 10/2009 | Kikuchi | H02J 7/0069 180/65.265 |
| 2013/0162218 A1* | 6/2013 | Kang | H02J 7/0069 320/134 |
| 2014/0079969 A1* | 3/2014 | Greening | G01R 31/3835 702/63 |
| 2017/0259686 A1* | 9/2017 | Lee | H02J 7/04 |
| 2018/0292461 A1* | 10/2018 | Kim | H01M 10/425 |
| 2021/0167607 A1* | 6/2021 | Masuda | H02J 7/0071 |
| 2022/0002008 A1* | 1/2022 | Tan | A61J 1/03 |

FOREIGN PATENT DOCUMENTS

| | | |
|---|---|---|
| DE | 102015218797 A1 | 3/2017 |
| EP | 1566648 A1 | 8/2005 |
| EP | 3174175 B1 | 2/2018 |

\* cited by examiner

METHOD FOR OPERATING AN ELECTRICAL ENERGY STORE SYSTEM

CROSS REFERENCE

The present application claims the benefit under 35 U.S.C. § 119 of German Patent Application No. DE 102019209037.0 filed on Jun. 21, 2019, which is expressly incorporated herein by reference it its entirety.

FIELD

The present invention relates to a method for operating an electrical energy store system including at least two electrical energy store units, to a corresponding device for operating an electrical energy store system, to a corresponding electrical energy store system, to a corresponding computer program, and to a corresponding machine-readable memory medium.

BACKGROUND INFORMATION

Today's electrical energy store systems, in particular, of electrically driven vehicles, include multiple electrical energy store units, in particular, battery cells. The individual electrical energy store units are usually connected in series with one another in the process to be able to provide a sufficiently high voltage. During operation of the vehicle, the battery cells are discharged for driving the vehicle and for supplying further consumers. But a small discharge of the battery cells in the form of a self-discharge or to supply consumers, such as an electronic control unit, with energy also takes place in the case of a stationary vehicle.

The discharge of the electrical energy store units does not necessarily take place uniformly. The voltages of the electrical energy store units are thus not all at the same level. The reasons for this are a different self-discharge and also a different aging of individual energy store units. The electrical energy store unit having the highest voltage determines the end of a charging process, and the electrical energy store unit having the lowest voltage determines the end of a discharging process.

Today's electrically driven vehicles include a battery management system which includes monitoring functions and diagnostic functions from component protection to occupant safety. In particular, the voltages of the individual electrical energy store units are measured and monitored. If errors occur in the battery system, these should be identified as quickly as possible, and measures should be taken. In the event of an error, a vehicle is not necessarily switched off immediately since this represents a safety risk for the following traffic. Depending on the error severity, the vehicle is transferred into an emergency operation and may, for example, still continue to drive a certain time at reduced power until a safe parking spot has been found, or the battery contactor opens in the event of critical errors, for example in the event of a short circuit of an electrical energy store unit, and the vehicle only still coasts to a halt.

No driver is present in an autonomous electrically driven vehicle, in particular, in an autonomous shuttle or robo-taxi, who may intervene in the event of an error to safely maneuver the vehicle out of a hazard area. The vehicle must be able to decide itself how to handle the instantaneous error, for example whether it is possible to continue to travel to the next service station or final stop, or whether stopping is required immediately. If necessary, a decision has to be made as to whether the vehicle may continue to be operated at the same power, or whether the continued travel occurs at reduced power and reduced speed.

As a result of a failure of a measuring line, it is possible that the voltage of an affected electrical energy store unit is no longer measurable. For safety reasons, in today's vehicles this may result in the entire electrical energy store system being switched off, or in a reduced driving operation. This means that the vehicle is only still able to continue to drive at reduced power, and thus at reduced speed. This emergency operation makes it possible to move safely away from the road and to be able to park the vehicle in a parking lot or in an emergency stopping bay, or also to still reach the next repair shop. There are different safety levels for the autonomous driving, which differ, among other things, in differently long travel distances after the occurrence of an error.

Depending on the predefined cutoff voltages during charging or discharging, the electrical energy store system may still be operated for variable periods, a preferably long operating time being desirable within the meaning of the use of the system. This, however, is only restrictedly possible with fixedly predefined voltage limits.

U.S. Patent Application Publication No. US 2005/0017684 describes a method for charging a lead acid battery which ends the charging process as a function of the first time derivative and the second time derivative of the charge voltage.

U.S. Patent Application Publication No. US 2008/0164849 describes a method for charging a rechargeable battery which limits the charge current based on the first time derivative of the battery voltage.

SUMMARY

The present invention relates to a method for operating an electrical energy store system including at least two electrical energy store units.

In accordance with an example embodiment of the present invention, the voltages of the at least two electrical energy store units are ascertained in the process, for example by measurement. Thereafter, an ascertainment of at least one first characteristic value of the detected voltages takes place. This may take place, for example, by a processing and an analysis of the ascertained voltage values in a data processing unit.

Furthermore, a charge voltage limiting value and/or a discharge voltage limiting value is/are ascertained as a function of the ascertained at least one first characteristic value, and thereafter the electrical energy store system is operated as a function of the ascertained charge voltage limiting value and/or as a function of the ascertained discharge voltage limiting value.

This is advantageous since more energy may be withdrawn from the electrical energy store system as a result of the characteristic value-dependent ascertainment of the limiting values, while preserving the safety, compared to a fixed predefinition of the limiting values. This increases the operating time and enlarges the range of use of the electrical energy store system.

Further advantageous specific example embodiments of the present invention are described herein.

In accordance with an example embodiment of the present invention, the at least one first characteristic value advantageously encompasses a first time derivative of the ascertained voltages and/or a second derivative of the ascertained voltages. For example, the first time derivative of recorded voltage values of an electrical energy store unit may be determined by numerical differentiation. This is possible in an analogous manner for the second time derivative. Furthermore, the at least one first characteristic value may encompass an average value of the ascertained voltages and/or an external deviation, i.e., a minimum or maximum deviation, from the average value of the ascertained voltages.

This is advantageous since the described variables enable a particularly effective and safe operation of the electrical energy store system, and thus enable an effective use of the stored energy.

Advantageously, an error in the voltage detection of an electrical energy store unit of the electrical energy store system is detected. This is advantageous to adapt, in this case, the ascertainment of the limiting values and/or the ascertainment of the voltages of the electrical energy store units. For example, in the event of an error in the voltage detection, for example during a failure of the sensor system used for the voltage detection, a voltage of an electrical energy store unit may alternatively be ascertained from recorded measured values and the instantaneous measured value of an adjoining electrical energy store unit. Furthermore, an ascertainment with the aid of a mathematical model and recorded current values is also possible. This advantageously allows the continued operation of the electrical energy store system, taking the error into consideration. The mathematical model may, for example, encompass differential equations or difference equations or algebraic equations. Furthermore, a data-based characteristic map may also be an integral part of the mathematical model.

Advantageously, an electrical current is ascertained, for example with the aid of measurement, which flows into or out of at least one of the electrical energy store units. At least one second characteristic value of the detected electrical current is ascertained from the ascertained electric current or the corresponding current values, for example a maximum or minimum value of the current determined within a predefined time window, or its absolute value, or a relative current value, by referencing the capacity of the battery, for example 48 A at a capacity of 48 Ah correspond to 1 C. Furthermore, the charge voltage limiting value and/or the discharge voltage limiting value is/are additionally ascertained as a function of the ascertained at least one second characteristic value. In this way, a conservative limiting value may be selected in each case for high currents or high C values, and an accordingly less conservative value may be selected for small currents/small C values. In this way, an adaptation of the corresponding limiting value to the instantaneous operating circumstances or operating states of the battery advantageously takes place.

Advantageously, temperatures of at least two electrical energy store units are ascertained, and a third characteristic value of the ascertained temperature is determined. The third characteristic value may also encompass a first time derivative, for example. The ascertainment of the charge voltage limiting value or of the discharge voltage limiting value now additionally takes place as a function of the ascertained at least one third characteristic value. This is advantageous since the effect of a cooling or heating of the electrical energy store system is also taken into consideration in the process, which allows the voltage limits to be selected less conservatively.

The present invention furthermore relates to a device for operating an electrical energy store system including at least two electrical energy store units. In accordance with an example embodiment of the present invention, the device includes at least one means, the means being configured to carry out the steps of the described method. The device may also correspond to the at least one means. The at least one means may, for example, include a battery management control unit and a corresponding power electronics, for example an inverter, as well as current sensors and/or voltage sensors and/or temperature sensors. An electronic control unit, in particular, in the occurrence as a battery management control unit, may also be such a means. An electronic control unit may, in particular, be understood to mean an electronic control device including, for example, a microcontroller and/or an application-specific hardware component, e.g., an ASIC, but may also cover a memory-programmable control system. In this way, the above-described advantages are achieved.

The present invention furthermore relates to an electrical energy store system including at least two electrical energy store units, which includes the described device. In this way, the above-described advantages are achieved.

The present invention furthermore relates to a computer program, encompassing commands which cause the described device to carry out the described method steps. In this way, the above-described advantages are achieved.

The present invention furthermore relates to a machine-readable memory medium on which the described computer program is stored.

An electrical energy store unit may, in particular, be understood to mean an electrochemical battery cell and/or a battery module including at least one electrochemical battery cell and/or a battery pack including at least one battery module. For example, the electrical energy store unit may be a lithium-based battery cell or a lithium-based battery module or a lithium-based battery pack. In particular, the electrical energy store unit may be a lithium ion battery cell or a lithium ion battery module or a lithium ion battery pack. The battery cell may furthermore be a type of rechargeable lithium-polymer battery, rechargeable nickel-metal hydride battery, rechargeable lead acid battery, rechargeable lithium-air battery or rechargeable lithium-sulfur battery, or, in very general terms, a rechargeable battery having an arbitrary electrochemical composition. A capacitor is also possible as an electrical energy store unit.

BRIEF DESCRIPTION OF THE DRAWINGS

Advantageous specific embodiments of the present invention are shown in the figures and are described in greater detail in the description below.

DETAILED DESCRIPTION OF EXAMPLE EMBODIMENTS

Figure 1:
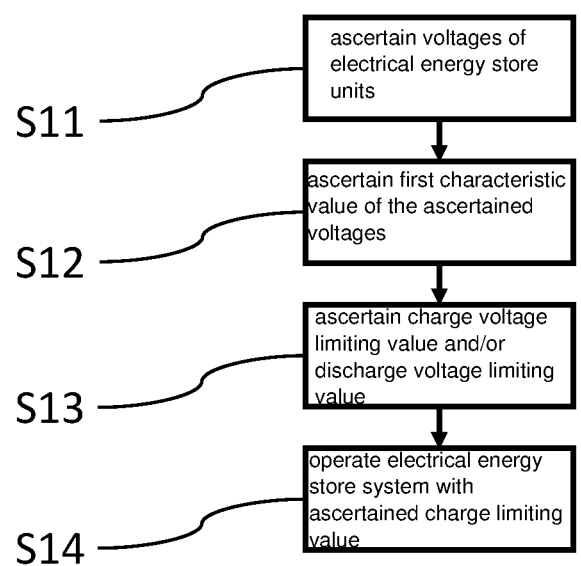
FIG. 1 shows a flow chart of the described method according to a first specific embodiment of the present invention.

Identical reference numerals denote identical device components or identical method steps in all figures.

FIG. 1 shows a flow chart of the described method for operating an electrical energy store system according to a first specific embodiment of the present invention. The electrical energy store system includes at least two electrical energy store units.

In a first step S11, the voltages of the at least two electrical energy store units are ascertained. This may take place by measurement using corresponding voltage measuring devices or, if a defect is present in such a voltage measuring device, also with the aid of the voltage values of adjoining energy store units. For this purpose, the last voltage value known to be valid is used as the starting value, and the voltage values of adjoining electrical energy store units are resorted to for the development of the voltage for which no instantaneous measured values are available. The assumption in the process is that adjoining energy store units develop similarly, and at least a good estimation of the voltage is thus possible for a certain time period.

In a second step S12, at least one first characteristic value of the ascertained voltages is ascertained. The at least one characteristic value preferably encompasses a first time derivative, a second time derivative, a mean value, and a maximum or minimum deviation of the ascertained voltages from the mean value. This means that, preferably, for each of the ascertained voltages the first time derivative, the second time derivative, and the external deviation from the mean value are ascertained. However, depending on the application, it may also be sufficient to accordingly evaluate only one or a portion of the ascertained voltages.

In a third step S13, a charge voltage limiting value and/or a discharge voltage limiting value is/are ascertained as a function of the ascertained at least one characteristic value. The corresponding charge voltage limiting value may, for example, arise as the result of the subtraction of the external deviation from a predefined safety voltage limiting value. If, for example, the safety voltage limiting value is 4.2 V, and the external deviation is 0.1 V, the resulting charge voltage limiting value is 4.1 V. Charging is safely possible up to this charge voltage limiting value.

In a fourth step S14, the electrical energy store system is subsequently operated safely with the charge voltage limiting value thus ascertained, even in the event of a failure of a voltage measuring device, and providing an increased power.

Figure 2:
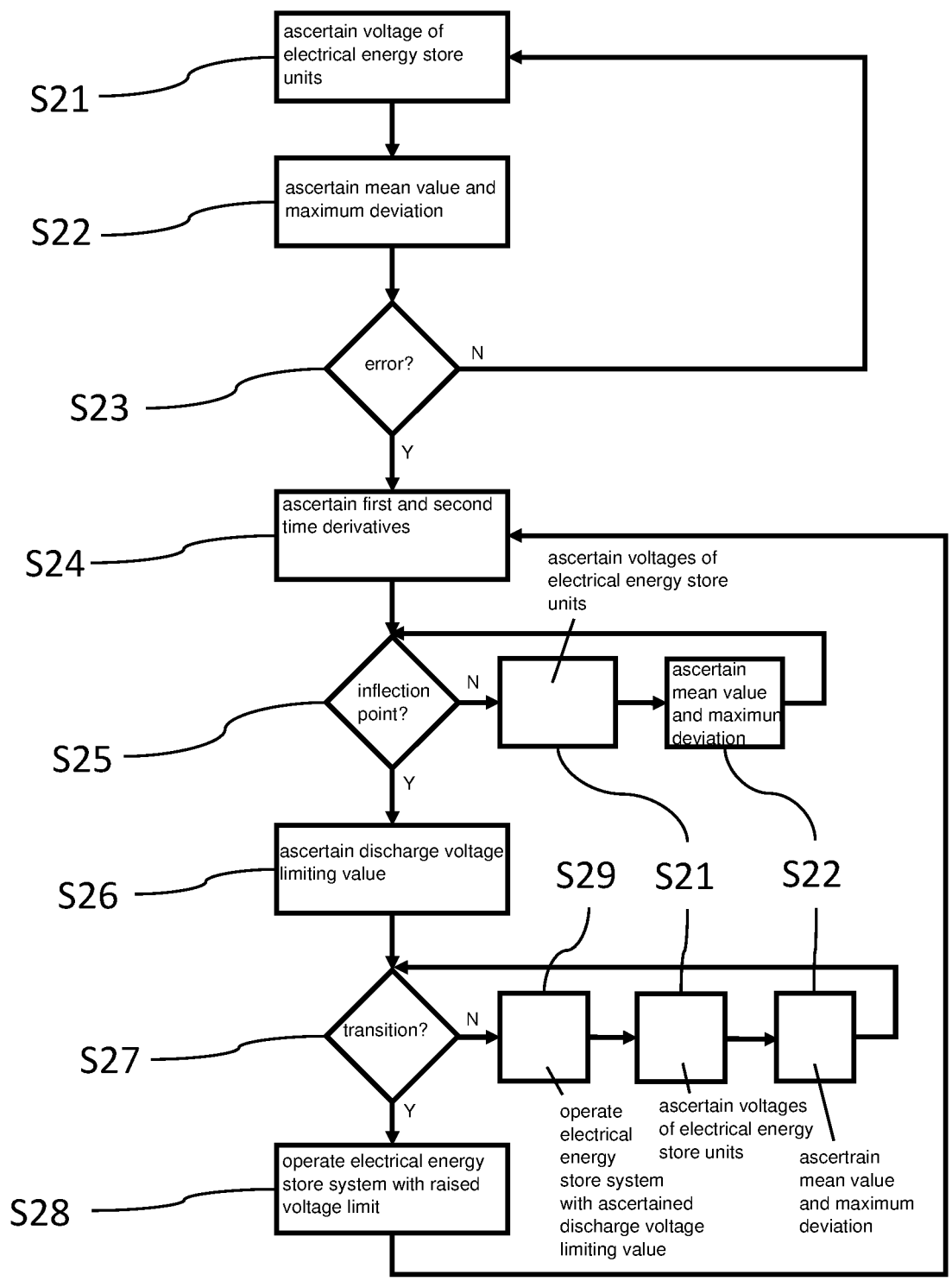
FIG. 2 shows a flow chart of the described method according to a second specific embodiment of the present invention.

FIG. 2 shows a flow chart of the described method for operating an electrical energy store system according to a second specific embodiment of the present invention. The electrical energy store system includes at least two electrical energy store units in the process. In a first step S21, the voltages of the at least two electrical energy store units are ascertained. In a second step S22, the mean value of the ascertained voltages and the maximum deviation of the ascertained voltages from the mean value are ascertained.

In a third step S23, a check is carried out as to whether an error exists in the voltage detection of an electrical energy store unit of the electrical energy store system. For example, this may result, on the one hand, from a defective voltage detection device or, for example, on the other hand, from a defective electrical energy store unit whose voltage is being detected. If no corresponding error is detected, the process continues with first step S21. If a corresponding error is detected, the process continues with fourth step S24.

In fourth step S24, the first time derivative and the second time derivative are each ascertained for the detected voltages. This may take place, for example, with the aid of numerical differentiation.

In a fifth step S25, it is checked whether an inflection point is present in the detected voltages. This may be checked, for example, based on whether the second time derivative is equal to zero or better, based on the numerical differentiation, whether a change of sign, i.e., from plus to minus or vice versa, occurs in the second time derivative. If no, the process continues with first step S21 and second step S22, and fifth step S25 is then carried out again. If yes, a discharge voltage limiting value is ascertained in a sixth step S26 as a function of the ascertained characteristic values. This may take place, for example, by subtracting half the absolute amount of the maximum deviation from a predefined lower voltage limit. In this way, more usable energy is available.

In a seventh step S27, it is checked whether a transition, i.e., a change of sign, from plus to minus takes place in the first time derivative. If yes, the discharge voltage limiting value is raised to the predefined voltage limit again, and in eighth step S28, the electrical energy store system is operated with the raised voltage limit. After eighth step S28, the process continues with fourth step S24. If no, the discharge voltage limiting value ascertained in sixth step S26 remains set, and the electrical energy store system is operated in a ninth step S29 with the discharge voltage limiting value ascertained in sixth step S26. Thereafter, first step S21 and second step S22 are carried out, and seventh step S27 is then carried out again.

The method may be applied in an analogous manner to the charging process and to the charge voltage limiting value.

Figure 3:
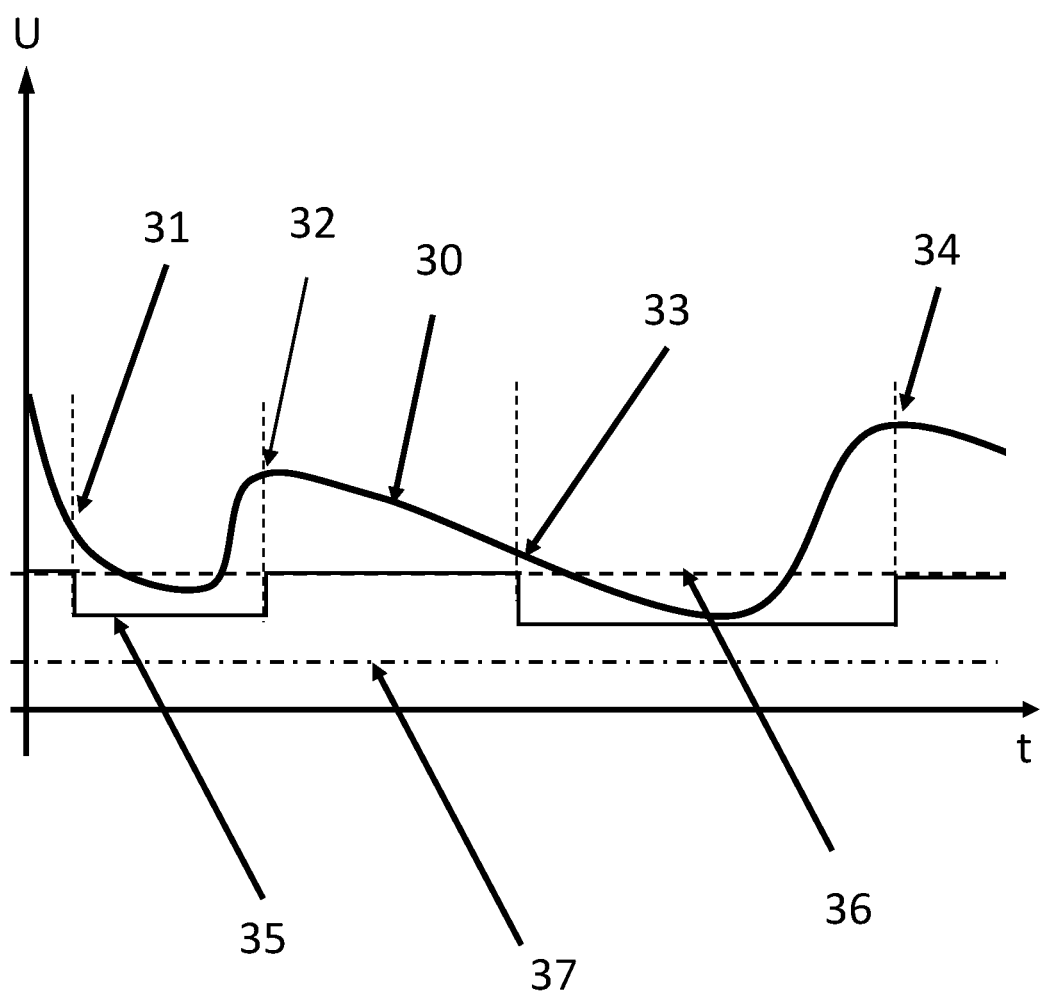
FIG. 3 shows a schematic voltage curve including a shown discharge voltage limiting value.

FIG. 3 shows, by way of example, a schematic voltage curve 30 of an electrical energy store unit including a shown discharge voltage limiting value curve 35 and a shown fixed lower voltage limit curve 36. Furthermore, a lower safety voltage level 37 is shown, a drop below which results in damage to the electrical energy store unit. The method described in FIG. 2 will be explained based on voltage curve 30 and the varying discharge voltage limiting value 35. It may be assumed, for example, that the at least two electrical energy store units present in the electrical energy store system show the same voltage curve.

The voltage of the electrical energy store unit is continuously ascertained, resulting in combination in voltage curve 30. An inflection point is detected at curve point 31, and the discharge voltage limiting value is ascertained as a function of the ascertained characteristic values and is reduced here accordingly by subtracting an absolute amount, for example half the absolute amount of the maximum deviation and/or of an absolute amount ascertained from a table as a function of the instantaneous current intensity. This means that more energy may safely be withdrawn from the electrical energy store system, without a corresponding power electronics cutting off the power supply.

This is apparent from the corresponding reduction of discharge voltage limiting value curve 35. The discharge voltage limiting value remains at the low level until, at curve point 32, a change from a positive time derivative value of the voltage to a negative derivative value is ascertained. The discharge voltage limiting value then assumes the value of the fixed lower voltage limit again.

At curve point 33, the detection of an inflection point in voltage curve 30 occurs. As a result, the discharge voltage limiting value is reduced again. The reduced discharge voltage limiting value is lower than with the preceding reduction. This may result, for example, from a lower current intensity, from which a higher absolute amount for the reduction of the discharge voltage limiting value is ascertained from the table as a function of the instantaneous current intensity.

At curve point 34, a change from a positive time derivative value of the voltage to a negative derivative value is ascertained. The discharge voltage limiting value then assumes the value of the fixed lower voltage limit again.

Figure 4:
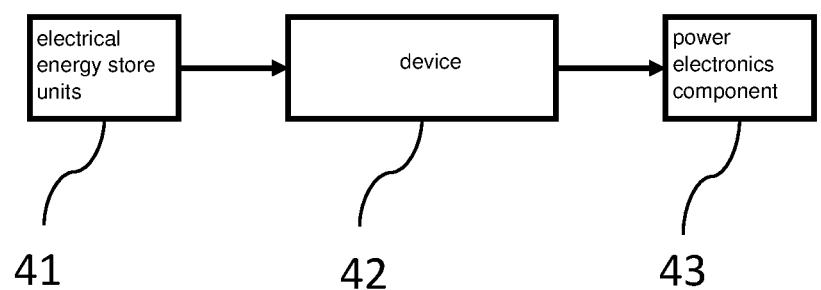
FIG. 4 shows a schematic representation of the described electrical energy store system according to one specific embodiment of the present invention.

FIG. 4 shows a schematic representation of the described electrical energy store system 40 including at least two electrical energy store units 41 according to one specific example embodiment of the present invention. A device 42 activates a power electronics component 43, for example an inverter, in such a way that the corresponding charge voltage limiting values or discharge voltage limiting values are adhered to. In the process, device 42 ascertains the electrical voltages of the at least two electrical energy store units 41, the corresponding characteristic values, and charge voltage or discharge voltage limiting values.

What is claimed is:

1. A method for operating an electrical energy store system including at least two electrical energy store units, the method comprising the following steps:
    a) ascertaining voltages of the at least two electrical energy store units;
    b) ascertaining at least one first characteristic value of the ascertained voltages;
    b1) ascertaining whether an inflection point is present in the ascertained voltages;
    c) ascertaining, as a function of the ascertained at least one characteristic value and in response to the ascertained inflection point, a charge voltage limiting value and/or a discharge voltage limiting value;
    c1) ascertaining a first time derivative of the ascertained voltages;
    c2) ascertaining that a transition corresponding to a change of sign takes place in the first time derivative, and in response to the transition, raising the discharge voltage limiting value to a predefined voltage limit; and
    d) operating the electrical energy store system as a function of the ascertained charge voltage limiting value and/or discharge voltage limiting value.

2. The method as recited in claim 1, wherein the at least one first characteristic value includes: (i) a second time derivative of the ascertained voltages, and/or (ii) an average value of the ascertained voltages, and/or (iii) an extremal deviation of the ascertained voltages from the average value of the ascertained voltages.

3. The method as recited in claim 1, further comprising the following step:
    e) detecting an error in a voltage detection of an electrical energy store unit of the electrical energy store system.

4. The method as recited in claim 1, further comprising the following steps:
    f) ascertaining an electric current flowing into or out of at least one of the electrical energy store units; and
    g) ascertaining at least one second characteristic value of the ascertained electric current;
    wherein the charge voltage limiting value and/or the discharge voltage limiting value additionally being ascertained as a function of the ascertained at least one second characteristic value.

5. The method as recited in claim 1, further comprising the following steps:
    h) ascertaining temperatures of the at least two electrical energy store units; and
    i) ascertaining at least one third characteristic value of the ascertained temperatures;
    wherein the ascertainment of the charge voltage limiting value and/or of the discharge voltage limiting value additionally taking place as a function of the ascertained at least one third characteristic value.

6. A device for operating an electrical energy store system including at least two electrical energy store units, the device including an electronic control unit, the electronic control unit configured to:
    a) ascertain voltages of the at least two electrical energy store units;
    b) ascertain at least one first characteristic value of the ascertained voltages;
    b1) ascertain whether an inflection point is present in the ascertained voltages;
    c) ascertain, as a function of the ascertained at least one characteristic value and in response to the inflection point, a charge voltage limiting value and/or a discharge voltage limiting value;
    c1) ascertaining a first time derivative of the ascertained voltages;
    c2) ascertaining that a transition corresponding to a change of sign takes place in the first time derivative, and in response to the transition, raising the discharge voltage limiting value to a predefined voltage limit; and
    d) operate the electrical energy store system as a function of the ascertained charge voltage limiting value and/or discharge voltage limiting value.

7. An electrical energy store system, comprising:
    at least two electrical energy store units; and
    a device for operating an electrical energy store system including the at least two electrical energy store units, the device including an electronic control unit, the electronic control unit configured to:
        a) ascertain voltages of the at least two electrical energy store units;
        b) ascertain at least one first characteristic value of the ascertained voltages;
        b1) ascertain whether an inflection point is present in the ascertained voltages;
        c) ascertain, as a function of the ascertained at least one characteristic value and in response to the inflection point, a charge voltage limiting value and/or a discharge voltage limiting value;
        c1) ascertaining a first time derivative of the ascertained voltages;
        c2) ascertaining that a transition corresponding to a change of sign takes place in the first time derivative, and in response to the transition, raising the discharge voltage limiting value to a predefined voltage limit; and
        d) operate the electrical energy store system as a function of the ascertained charge voltage limiting value and/or discharge voltage limiting value.

8. A non-transitory machine-readable storage medium on which is stored a computer program for operating an electrical energy store system including at least two electrical energy store units, the computer program, when executed by an electronic control unit, causing the electronic control unit to perform the following steps:
    a) ascertaining voltages of the at least two electrical energy store units;
    b) ascertaining at least one first characteristic value of the ascertained voltages;
    b1) ascertaining whether an inflection point is present in the ascertained voltages;
    c) ascertaining, as a function of the ascertained at least one characteristic value and in response to the inflection point, a charge voltage limiting value and/or a discharge voltage limiting value;
    c1) ascertaining a first time derivative of the ascertained voltages;

c2) ascertaining that a transition corresponding to a change of sign takes place in the first time derivative, and in response to the transition, raising the discharge voltage limiting value to a predefined voltage limit; and
d) operating the electrical energy store system as a function of the ascertained charge voltage limiting value and/or discharge voltage limiting value.

\* \* \* \* \*